United States Patent

Yang

[11] Patent Number: 6,027,158
[45] Date of Patent: Feb. 22, 2000

[54] BULLET-PROOF DOOR ASSEMBLY FOR A VEHICLE BODY

[76] Inventor: Gwo-Jen Yang, 14-1, No. 169-1, Sec. 3, Hsi-Tun Rd., Hsi-Tun Dist., Taichung City, Taiwan

[21] Appl. No.: 09/136,001

[22] Filed: Aug. 18, 1998

[51] Int. Cl.[7] .................................................. B60J 5/04
[52] U.S. Cl. ........................ 296/146.6; 296/188; 89/36.02
[58] Field of Search ................................. 296/146.6, 188; 89/36.01, 36.02, 36.04; 428/911

[56] References Cited

U.S. PATENT DOCUMENTS

| 4,316,404 | 2/1982 | Medlin | 296/146.6 |
| 5,703,316 | 12/1997 | Madden, Jr. | 89/36.02 |
| 5,811,719 | 9/1998 | Madden, Jr. | 89/36.02 |
| 5,934,737 | 8/1999 | Abouzahr | 296/146.6 |

Primary Examiner—Joseph D. Pape
Assistant Examiner—Greg Blankenship
Attorney, Agent, or Firm—Ladas & Parry

[57] ABSTRACT

A door assembly for mounting a lateral edge portion of a vehicle body, includes a door panel, a shield cover, a mounting rack, a flexible bulletproof sheet, and at least two stiff rods. The door panel includes an interior wall which has front and rear sides along a longitudinal direction. The shield cover is disposed to be spaced apart from the interior wall to define an elongate accommodation chamber therebetween which extends from the front side to the rear side. The mounting rack is detachably mounted on, and extends along the front side of the interior wall. The mounting rack has at least two lugs that extend in a transverse direction relative to the longitudinal direction. The lugs each define a mounting hole which faces towards the rear side of the interior wall. The flexible bulletproof sheet is disposed in the accommodating chamber and is of such a dimension as to overlay the shield cover. The flexible bulletproof sheet has left and right side portions along the longitudinal direction. The stiff rods are disposed on the flexible bulletproof sheet, and each have a left end to be inserted into a respective one of the mounting holes and a right end to be anchored to the rear side of the interior wall in such a manner as to stretch the bulletproof sheet longitudinally.

3 Claims, 5 Drawing Sheets

BULLET-PROOF DOOR ASSEMBLY FOR A VEHICLE BODY

BACKGROUND OF THE INVENTION

1. Field of the Invention

The invention relates to a door assembly, more particularly to a bulletproof door assembly for a vehicle body.

2. Description of the Related Art

Conventionally, the bulletproof door assembly for a vehicle body is usually constructed simultaneously with the vehicle body during the manufacturing process of the vehicle body since such a door assembly is relatively heavy and the construction thereof includes several complicated procedures and results in great expense. Due to its high cost, the conventional bulletproof door assembly is unaffordable to a common car user for installation to his car.

SUMMARY OF THE INVENTION

Therefore, the object of this invention is to provide a bulletproof door assembly that is cheaper in cost and can be easily installed in a vehicle body to provide safety for the vehicle user.

Accordingly, a door assembly of this invention is adapted to be mounted on a vehicle body along a lateral edge portion, and includes a door panel, a shield cover, a mounting rack, a flexible bulletproof sheet, and at least two stiff rods. The door panel includes an interior wall which has front and rear sides along a longitudinal direction and adapted to be proximate and distal to the lateral edge portion, respectively. The shield cover is disposed to be spaced apart from the interior wall to define an elongate accommodation chamber therebetween which extends from the front side to the rear side. The mounting rack is detachably mounted on, and extends along the front side of the interior wall. The mounting rack has at least two lugs that extend in a transverse direction relative to the longitudinal direction. The lugs each have a mounting hole which faces towards the rear side of the interior wall. The flexible bulletproof sheet is disposed in the accommodating chamber between the interior wall and the shield cover and is of such a dimension as to overlay the shield cover. The flexible bulletproof sheet has left and right side portions along the longitudinal direction. The stiff rods are disposed on the flexible bulletproof sheet, and each have a left end to be inserted into a respective one of the mounting holes and a right end to be anchored to the rear side of the interior wall in such a manner that the flexible bulletproof sheet is stretched out in the longitudinal direction.

Preferably, the flexible bulletproof sheet is encased by a waterproof sheath. The waterproof sheath is further provided with two retaining pockets integrally formed therewith which extend along the longitudinal direction between the front and rear sides of the interior wall to permit extension of the stiff rods which facilitates mounting and stretching of the flexible bulletproof sheet.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
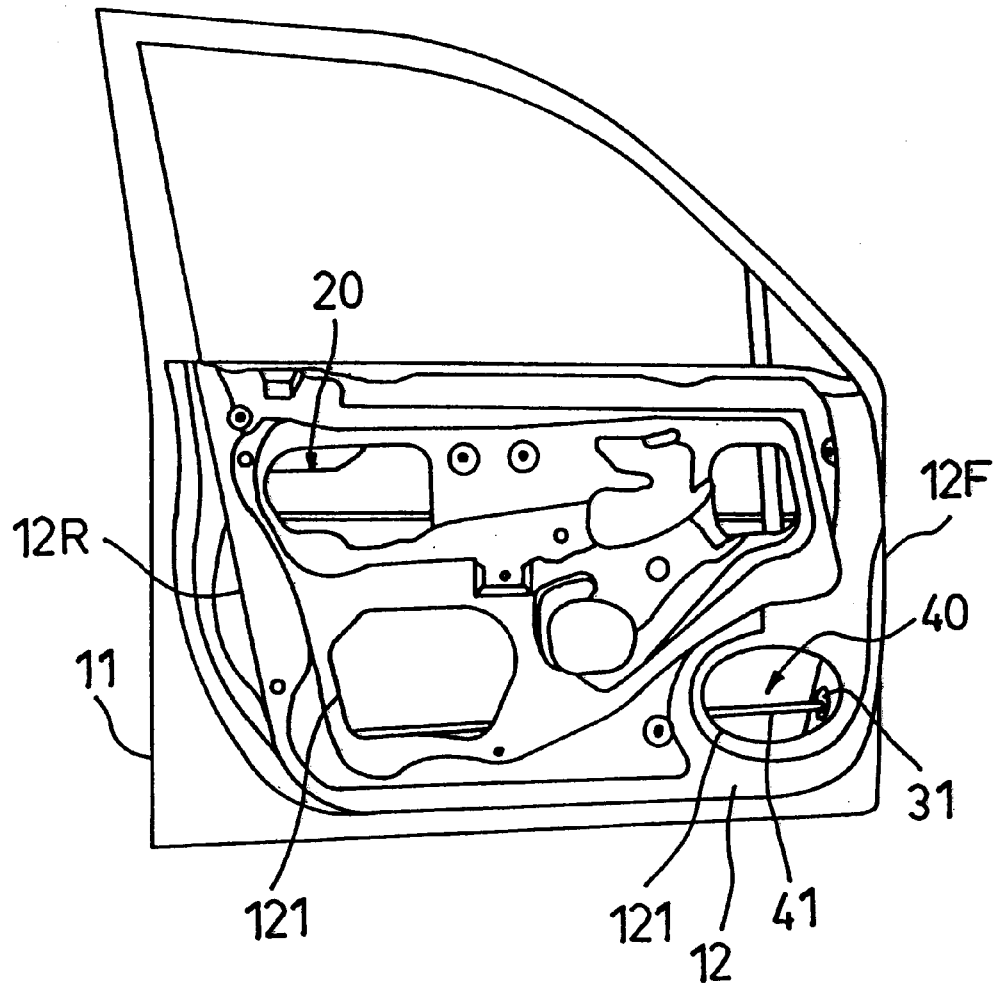
FIG. 1 is a perspective and partial exploded view of the bulletproof door assembly of this invention for use in a vehicle body.
Figure 2:
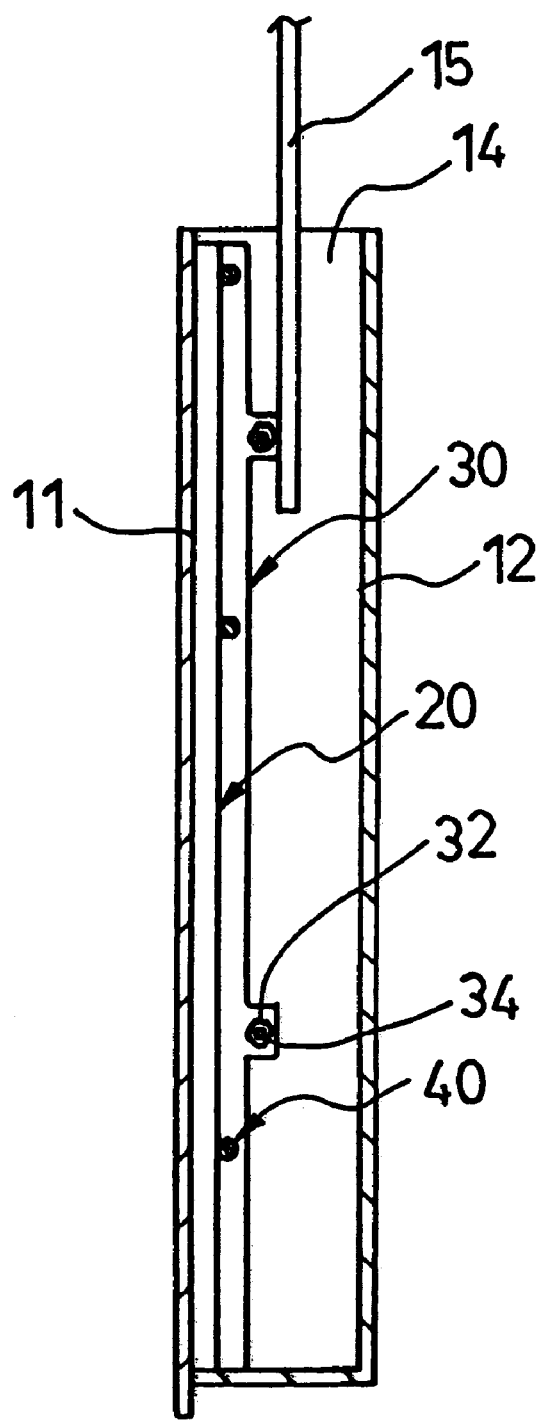
FIG. 2 is partial sectional of the bulletproof door assembly of this invention, illustrating the interior thereof.
Figure 3:
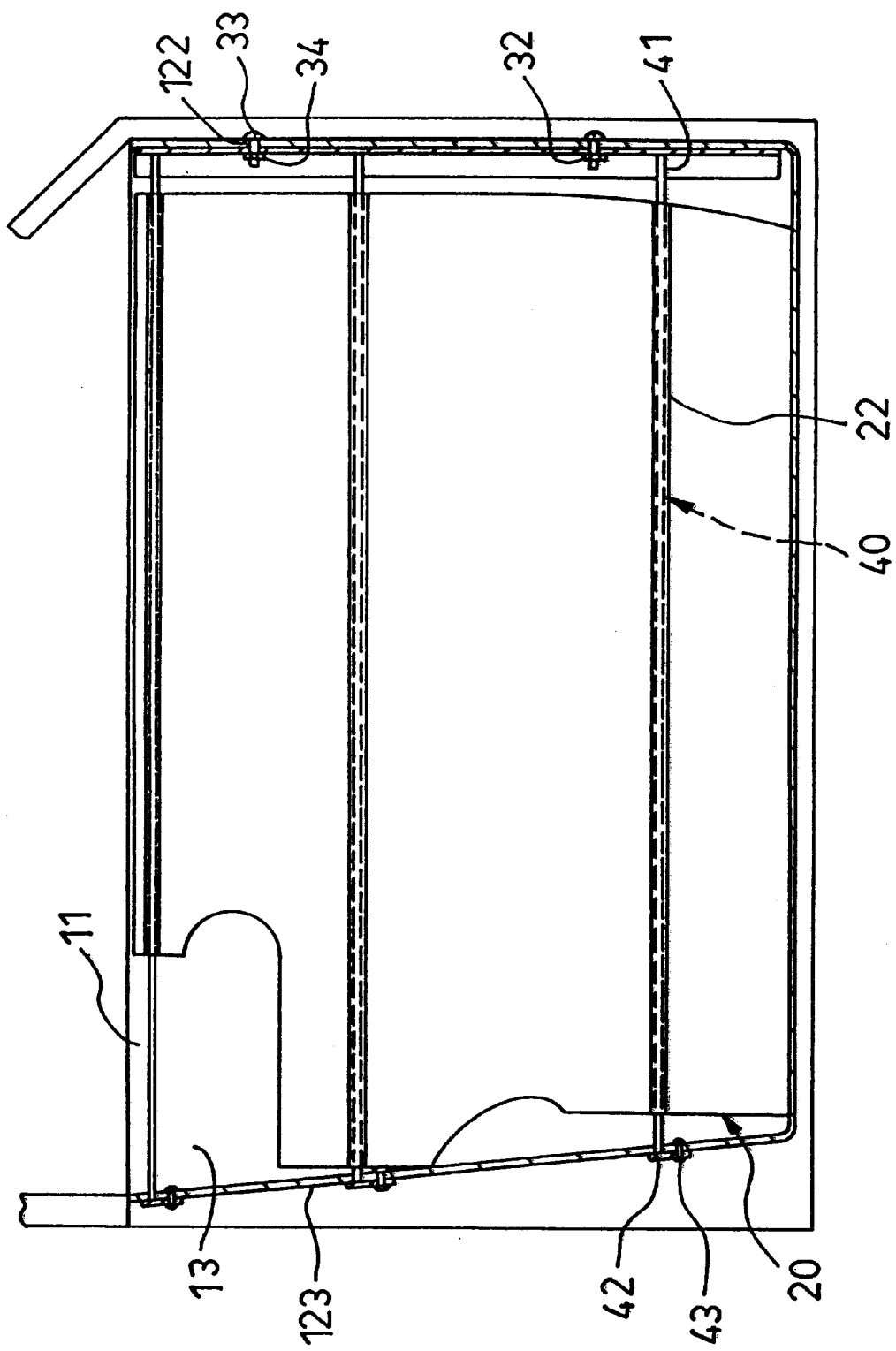
FIG. 3 is a partial sectional view of the bulletproof door assembly of this invention, illustrating the manner in which the flexible bulletproof sheet is stretched therein.
Figure 4:
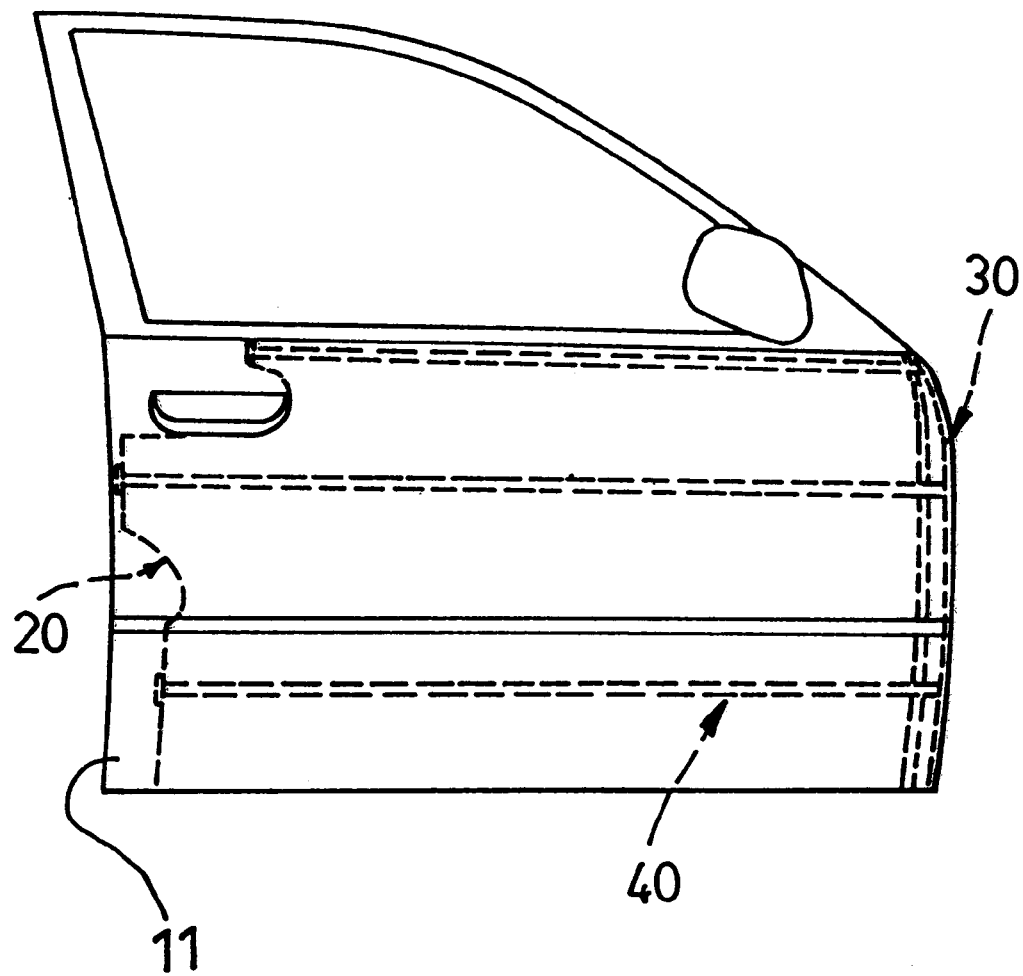
FIG. 4 is a perspective view of the bulletproof door assembly of this invention.
Figure 5:
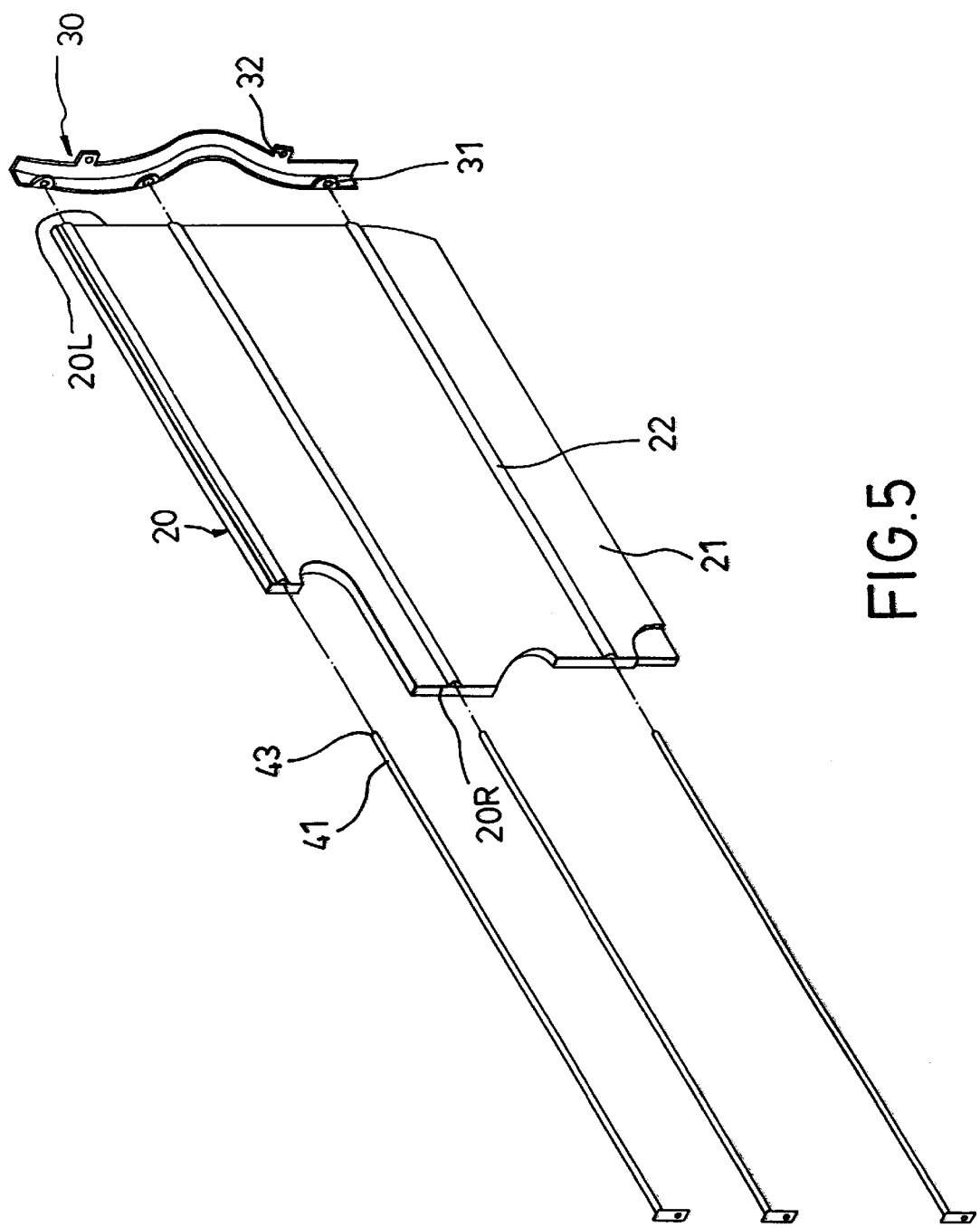
FIG. 5 is an exploded view of the bulletproof door assembly of this invention, where the interior wall and the shield cover are removed to illustrate the mounting of the flexible bulletproof sheet therein.

Referring to FIGS. 1, 2 and 5, a preferred embodiment of the bulletproof door assembly according to this invention is adapted to be mounted in vehicle body (not shown) along a lateral edge portion is shown. The bulletproof door assembly includes a door panel, a shield cover 11, a mounting rack 30, a flexible bulletproof sheet 20, and at least two stiff rods 41.

As illustrated, the door panel includes an interior wall 12 which has front and rear sides 12F, 12R along a longitudinal direction and respectively adapted to be proximate and distal to the lateral edge portion of the vehicle body.

The shield cover 11 is disposed to be spaced apart from the interior wall 12 to define an elongate accommodation chamber 14 therebetween which extends from the front side 12F to the rear side 12R.

The mounting rack 30 is detachably mounted on and extends along the front side 12F of the interior wall 12. The mounting rack 30 has three lugs 31 that extend in a transverse direction relative to the longitudinal direction. Each of the lugs 31 defines a mounting hole which faces towards the rear side 12R of the interior wall 12.

The flexible bulletproof sheet 20 is disposed in the accommodating chamber 14 between the interior wall 12 and the shield cover 11 and is of such a dimension as to overlay the shield cover 11. The bulletproof sheet 20 has left and right side portions 20L, 20R along the longitudinal direction.

Each of the stiff rods 41 is disposed on the bulletproof sheet 20, and has a left end 43 to be inserted into the respective mounting hole in the lug 31 and a right end 42 to be anchored to the rear side 12R in such a manner that the flexible bulletproof sheet can be stretched out in the longitudinal direction.

In the preferred embodiment, the bulletproof sheet 20 is encased by a waterproof sheath 21 that is generally made from a plastic material. Three retaining pockets 22 are provided on and integrally formed with the waterproof sheath 21 and extend along the longitudinal direction between the front and rear sides 12F, 12R of the interior wall 12 to permit extension of the stiff rods 41, which in turn, facilitate the mounting and stretching of the bulletproof sheet 20.

Note that the bulletproof sheet 20 employed in this embodiment is similar to those used in the conventional bulletproof jacket except that the dimension is larger in order to conform with the door assembly of this invention. Since the bulletproof sheet 20 is to be inserted only after installation of the door assembly on the vehicle body, the interior wall 12 is preferably provided with a plurality of through holes 121 via which the mounting rack 30 for holding the left side 20L of the bulletproof sheet 20 can be inserted. Thus, two front lugs 32 of the mounting rack 30 can be fixed in two mounting holes 122 provided on the interior wall 12 by the use of bolts 33 and nuts 34. Similarly, the right ends 42 of the stiff rods 41 are screwed by the fastener bolts 43 in the screw holes 123 that are formed through the rear side 12R of the interior wall 12.

Note that a glass panel 15 (see FIG. 2) and a device for raising up or lowering down the glass panel 15 for opening or closing a window of the door assembly are also mounted in the accommodating chamber 14. However, the presence of the bulletproof sheet 20 in the accommodating chamber 14 does not affect the raising and lowering actions on the glass panel 15.

As explained above, the bulletproof door assembly of this invention can be mounted on the vehicle body with little difficulty. Thus, the object of this invention is achieved.

With this invention thus explained, it is apparent that numerous modifications and variations can be made without departing from the scope and spirit of this invention. It is therefore intended that this invention be limited only as indicated in the appended claims.

I claim:

1. A door assembly adapted to be mounted on a vehicle body along a lateral edge portion, comprising:

a door panel including an interior wall which has front and rear sides along a longitudinal direction adapted to be proximate and distal to the lateral edge portion, respectively;

a shield cover disposed to be spaced apart from said interior wall to define an elongate accommodation chamber therebetween which extends from said front side to said rear side;

a mounting rack detachably mounted on and extending along said front side, and having at least two lugs extending therefrom in a transverse direction relative to said longitudinal direction, said at least two lugs each defining a mounting hole which faces towards said rear side;

a flexible bulletproof sheet disposed in said accommodating chamber and interposed between said interior wall and said shield cover and being of such a dimension as to overlay said shield cover, said flexible bulletproof sheet having left and right side portions along said longitudinal direction; and at least two stiff rods disposed on said flexible bulletproof sheet, each having a left end to be inserted into a respective one of said mounting holes and a right end to be anchored to said rear side in such a manner that said flexible bulletproof sheet can be stretched out in said longitudinal direction.

2. The door assembly as defined in claim 1, wherein said flexible bulletproof sheet is encased by a waterproof sheath.

3. The door assembly as defined in claim 2, further comprising at least two retaining pockets provided on and integrally formed with said waterproof sheath and extending along said longitudinal direction between said front and rear sides to permit extension of said stiff rods for facilitating the mounting and stretching of said flexible bulletproof sheet.

* * * * *